Dec. 13, 1938.  E. V. DE BLIEUX  2,140,377
POWER SUPPLY FOR RECTIFIER AUXILIARIES
Filed Dec. 6, 1935   2 Sheets-Sheet 2

Inventor:
Earl V. De Blieux,
by Harry E. Dunham
His Attorney.

Patented Dec. 13, 1938

2,140,377

UNITED STATES PATENT OFFICE

2,140,377

POWER SUPPLY FOR RECTIFIER AUXILIARIES

Earl V. De Blieux, Pittsfield, Mass., assignor to General Electric Company, a corporation of New York Application December 6, 1935, Serial No. 53,196

6 Claims. (Cl. 175—363)

My invention relates to electric systems wherein energy is transferred between an alternating current circuit and a direct current circuit by a vapor electric device such as a mercury arc rectifier.

The invention relates particularly to voltage supply means for the auxiliary electrodes and other auxiliary devices of high-voltage vapor electric apparatus and its object is to provide a means for this purpose which is of simplified construction and low cost.

In electric systems incorporating mercury arc rectifiers, a number of auxiliaries are operatively associated with the rectifier, including grids, ignition anodes, and excitation anode equipment, and further including auxiliaries such as exhaust devices, heating devices, etc., also operatively associated with the rectifier. Since the rectifier operates at a comparatively high potential above ground, the auxiliary devices cannot be supplied with power directly from low voltage lighting and power circuits and, therefore, require the use of a number of insulating transformers to insulate the supply circuits for the auxiliaries from the rectifier tank potential.

Difficulties have been encountered, however, in the use of the usual insulating transformers above described, particularly in radio and other special mercury arc rectifier applications, where the rectifier tank operates at potentials of from 10 to 20 kv. above ground. The provision of these numerous insulating transformers has involved unusually expensive construction, by reason especially of the required relatively large number of high voltage bushings, and tanks for mounting the bushings. In accordance with my invention, these difficulties are obviated by the provision of an auxiliary voltage-supply means which combines the separate numerous insulating transformers into a single unit.

My invention will be better understood from the following description when considered in connection with the accompanying drawings and its scope will be pointed out in the appended claims.

Figure 1:
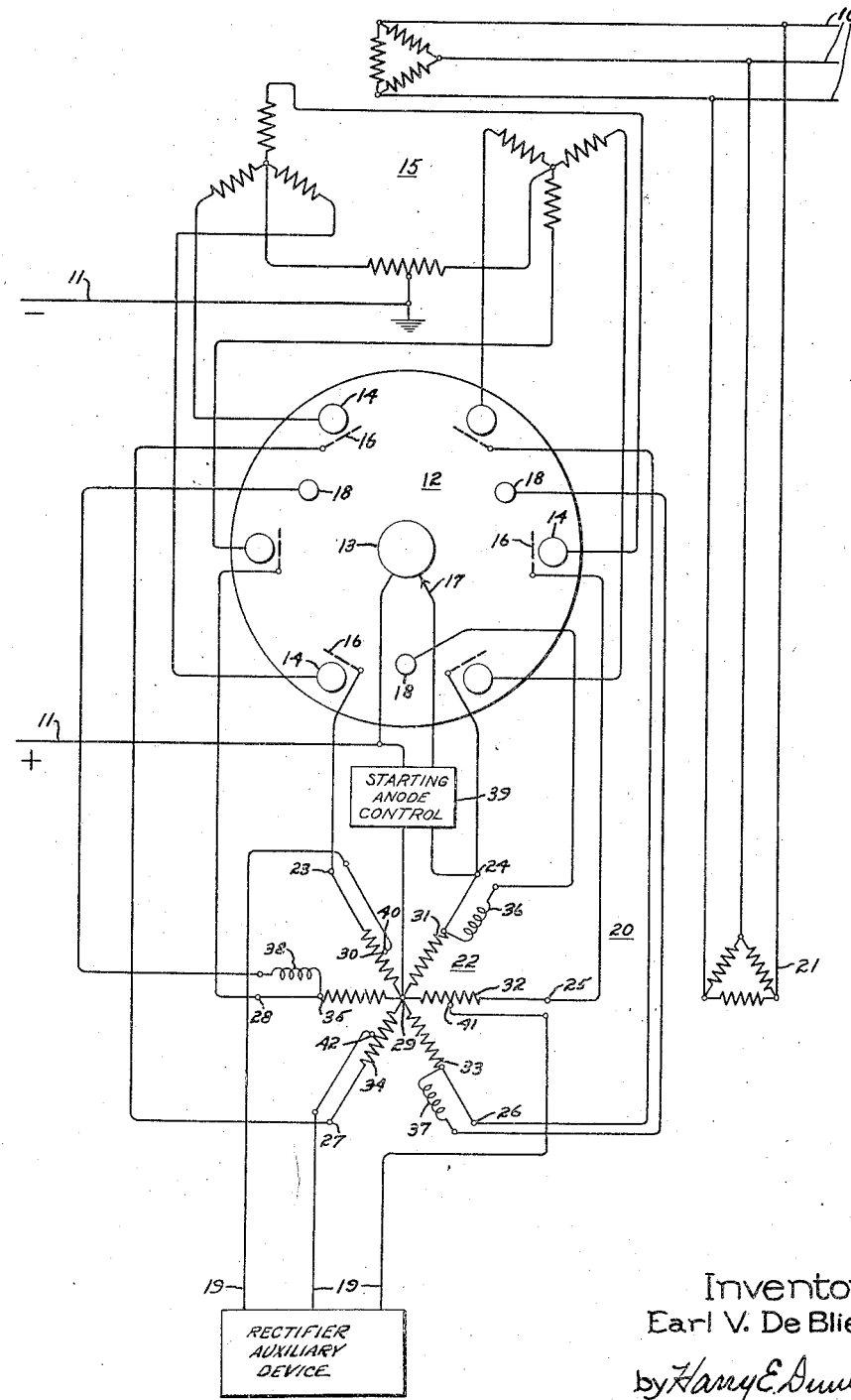
Figure 2:
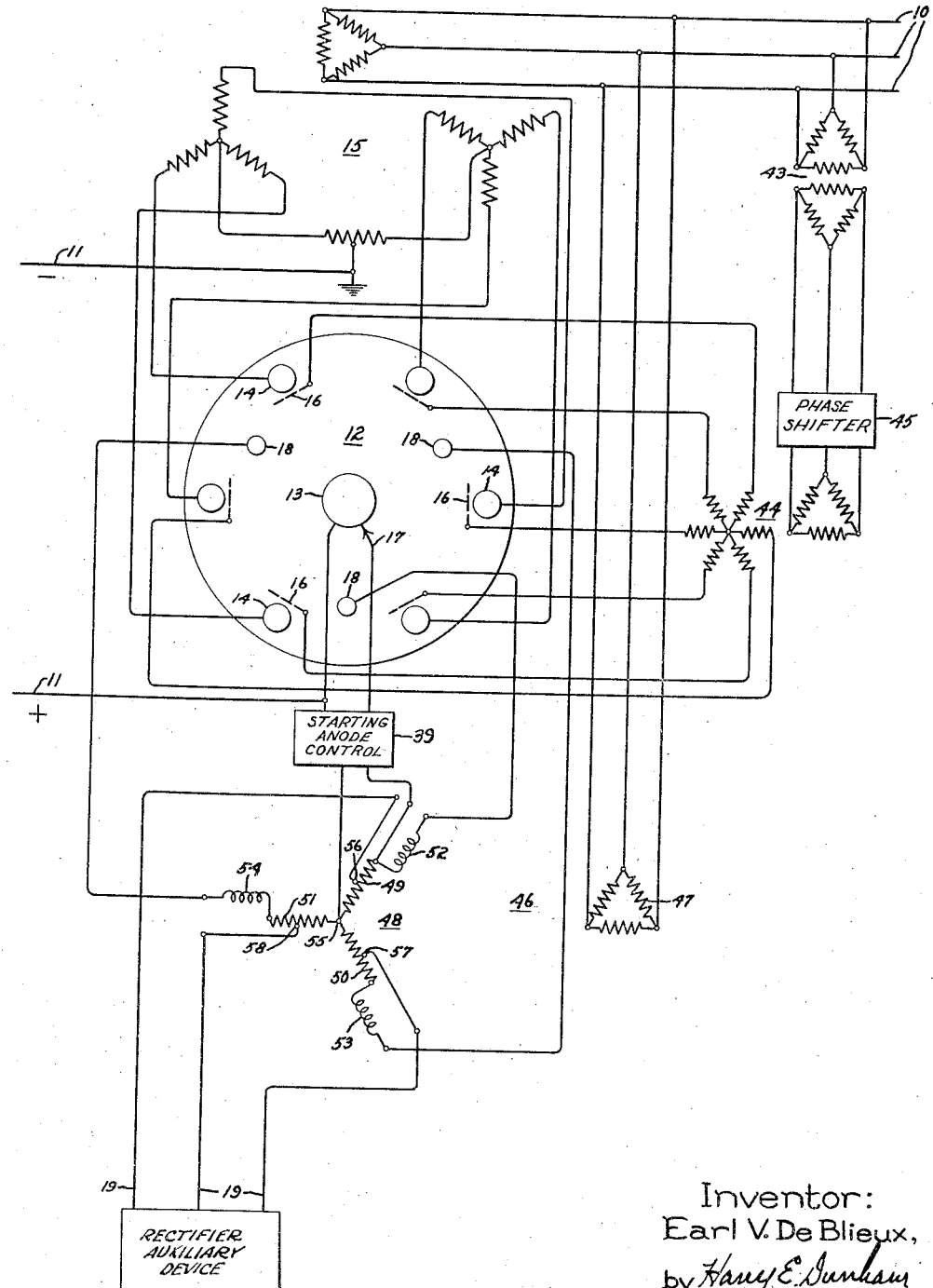

Referring to the drawings, Fig. 1 is a diagrammatic representation of a mercury arc rectifier system in which my invention has been embodied, and Fig. 2 is a diagrammatic representation of a mercury arc rectifier system embodying a modification of my invention.

In Fig. 1 the numerals 10 and 11 designate respectively an alternating current circuit and a direct current circuit between which power is transferred by a vapor electric apparatus 12, which in the present embodiment is a mercury arc rectifier having a cathode 13 and a plurality of main anodes 14 which, for purposes of illustration, are shown as six anodes connected to the secondary terminals of a six phase main transformer 15.

Auxiliary devices are provided in the rectifier 12 including grids 16 associated respectively with the main anodes 14, an ignition or starting anode 17, and excitation anodes 18 which are three in number in the present embodiment. Further auxiliary devices (not shown), also operatively associated with the rectifier, as hereinabove set forth, are provided adapted to be connected to an auxiliary device circuit 19.

In order to supply voltages for the auxiliary equipment and devices, I provide, in accordance with the present invention, in place of the numerous separate insulating transformers, a voltage supply unit 20 which may comprise a transformer having a primary 21, such as a three phase winding connected to a suitable voltage source, as alternating current circuit 10, and a multi-phase diametric connection 22, which in the present case is six phase, in inductive relation with primary 21. The diametric connection 22 is wound for a desired low voltage, as 110 v., from line terminals 23 to 28 to neutral terminal 29 of the phases 30 to 35.

To obtain the desired grid potentials, the phase terminals 23 to 28 are connected respectively to the grids 16. To obtain the desired excitation potentials the terminals of alternate phases, as phases 31, 33, and 35, are connected preferably respectively through the three phases 36, 37, and 38 of a reactor, to the excitation anodes 18. To provide the required potentials for actuating the ignition anode 17, a starting anode control means to which the ignition anode is connected and which is shown conventionally at 39, is connected to the neutral point 29 and to one of the phases, as phase 31, of the diametric connection 22. To obtain the required voltages for the additional auxiliary devices adapted to be connected to auxiliary device circuit 19, the three leads of the latter circuit are connected respectively to taps 40 to 42, in alternate phases, as phases 30, 32 and 34 of the diametric connection 22, the taps being located at the proper points in the three phases to give a desired low voltage, as 110 v., line to line. These three taps therefore constitute in effect the terminals for a 110 v. line to line insulating transformer, which supplies voltage to the above mentioned group of additional auxiliaries.

It will be seen that from each of the phases 30 to 35 of diametric connection 22, a pair of leads proceed the six pairs being connected respectively to end terminal 23 and tap 40, and terminal 24 and reactor phase 36, end terminal 25 and tap 41, end terminal 26 and reactor phase 37, end terminals 27 and tap 42, and end terminal 28 and reactor phase 38. To insulate these pairs of leads, no more than six bushings (not shown) need be employed. These bushings may be insulated, for example, for 3 kv. between leads and for 70 kv. from all leads to ground, each pair of leads being brought out through a corresponding one of the bushings. To insulate the lead from the neutral point 29 in certain cases, where, for example, the required test potential between grids 16 and cathode 13 is not more than 3 kv., this lead may also be brought out through one of the above mentioned six bushings. In other cases, an additional bushing will be required for the insulation of the neutral terminal lead.

In operation under load of the system illustrated in Fig. 1, and under standby and starting conditions, it will readily be seen from the preceding description that the voltages required for all auxiliary circuits are provided from the several secondary phases of the single transformer 20, with a marked reduction in complication and cost of the auxiliary supply voltage apparatus. The supply of voltage for the auxiliaries is effected with negligible disturbance of the grid voltages, the variation in the voltage impressed on the various grids, due to the regulation in the transformer from the other auxiliary loads, being only a few per cent.

In Fig. 2, the system illustrated is similar in general to that illustrated in Fig. 1. In the modification shown in Fig. 2, however, it is assumed that the phase of the voltage impressed on the grids 16 is required to be variable, and in such case a separate grid excitation means is provided, which may comprise a separate insulating transformer 43, and a grid transformer 44 connected to the secondary side of the insulating transformer. A suitable phase shifter means indicated conventionally at 45, is provided for the control of the grid potential phase. The other auxiliary circuits, however, are supplied with voltage, in accordance with my present invention from a transformer means 46 comprising a primary 47 and a diametric connection 48 which in the present case is three-phase only since the six grids are not supplied therefrom. Potentials for the excitation anodes 18 are supplied from the phases 49 to 51 of diametric connection 48 through the phases 52 to 54 of a reactor. Potentials for actuating the ignition anode 17 are supplied by connecting the starting anode control means shown at 39 to the neutral point 55 and one of the phases, as phase 49. Potentials for the auxiliary device circuit 19 are supplied by connecting the leads of the latter circuit to taps 56 to 58 in the three phases 49 to 51.

For the auxiliary voltage supply unit shown in Fig. 2, comprising the diametric connection 48, either three or four bushings are required, depending on whether or not test voltage conditions are such that the lead connected to neutral point 55 can be brought out through the same bushing with one of the three pairs of leads proceeding from the phases 49 to 51.

The operation of the auxiliary voltage supply means illustrated in Fig. 2, will be readily understood by reference to the description of operation of the system illustrated in Fig. 1.

My invention has been described herein in particular embodiments for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States, is:

1. In an electric system comprising an alternating current circuit, a direct current circuit, a multi-anode vapor electric apparatus to transfer energy between said circuits, a plurality of grids, a plurality of excitation anodes, an ignition anode control means, and an auxiliary device circuit, a voltage supply means comprising a primary winding having a multiphase diametric secondary connection inductively related therewith, the several phases being connected respectively at their end terminals to said grids, certain of said phases being connected respectively at their end terminals to said excitation anodes, the neutral of said connection and the end terminal of one of said phases being connected to said control means, taps intermediate the neutral point of said connection and the end terminals of certain of said phases being connected to said auxiliary device circuit.

2. In an electric system comprising an alternating current circuit, a direct current circuit, a six anode vapor electric apparatus to transfer energy between said circuits, six grids, three excitation anodes, an ignition anode control means, and an auxiliary device circuit, a voltage supply means, a primary winding and a six phase diametric secondary connection inductively related therewith, the six phases being connected respectively at their end terminals to said grids, alternate phases of said connection being connected respectively at their end terminals to said excitation anodes, the neutral of said connection and the end terminal of one of said phases thereof being connected to said control means, taps intermediate the neutral point of said connection and the end terminals of alternate phases of said connection being connected to said auxiliary device circuit.

3. In an electric system comprising an alternating current circuit, a direct current circuit, a multi-anode vapor electric apparatus to transfer energy between said circuits, a plurality of grids, a plurality of excitation anodes, an ignition anode control means, and an auxiliary device circuit, a voltage supply means comprising an excitation anode reactor and a primary winding having a multiphase diametric secondary connection inductively related therewith, the several phases being connected respectively at their end terminals to said grids, certain of said phases being connected respectively at their end terminals through said reactor to said excitation anodes, the neutral of said connection and the end terminal of one of said phases being connected to said control means, taps intermediate the neutral point of said connection and the end terminals of certain of said phases being connected to said auxiliary device circuit.

4. In an electric system comprising an alternating current circuit, a direct current circuit, a six anode vapor electric apparatus to transfer energy between said circuits, six grids, three excitation anodes, an ignition anode control means, and an auxiliary device circuit, a voltage supply means comprising a three phase excitation anode reactor, a primary winding and a six phase diametric secondary connection inductively related therewith, the six phases being connected respectively at their end terminals to said grids, alternate phases of said connection being connected respectively at their end terminals through said reactor to said excitation anodes, the neutral of said connection and the end terminal of one of said phases thereof being connected to said control means, taps intermediate the neutral point of said connection and the end terminals of alternate phases of said connection being connected to said auxiliary device circuit.

5. In an electric system comprising an alternating current circuit, a direct current circuit, a multi-anode vapor electric apparatus to transfer energy between said circuits, a plurality of grids, a plurality of excitation anodes, an ignition anode control means, and an auxiliary device circuit, a voltage supply means comprising a primary winding having a multiphase diametric secondary connection inductively related therewith, means to connect the several phases at their end terminals to said grids, means to connect certain of said phases at their end terminals to said excitation anodes, means to connect the neutral of said connection and the end terminal of one of said phases to said ignition anode control means, and means to supply voltage from certain of said phases to said auxiliary device circuit.

6. In an electric system comprising an alternating current circuit, a direct current circuit, a multi-anode vapor electric apparatus to transfer energy between said circuits, a plurality of grids, a plurality of excitation anodes, an ignition anode control means, and an auxiliary device circuit operatively associated with said vapor electric apparatus, a transformer means including a multiphase diametric secondary connection, means to connect said phases respectively at their end terminals to said excitation anodes, means to connect the neutral of said connection and the end terminal of one of said phases to said control means, means to supply voltage from said phases to said auxiliary device circuit, and means separate from said transformer means to supply voltage from said alternating current circuit to said grids and to control the phase of said last-named voltage.

EARL V. De BLIEUX.